Dec. 15, 1936. G. E. TUSCAN ET AL 2,064,131
ICE CREAM FREEZER
Filed Jan. 2, 1934 6 Sheets-Sheet 1

Inventors.
George E. Tuscan
Wilfred F. Mathewson
by Heard Smith & Tennant
Attys.

Dec. 15, 1936.                G. E. TUSCAN ET AL                2,064,131
                                ICE CREAM FREEZER
                              Filed Jan. 2, 1934              6 Sheets-Sheet 2

Inventors.
George E. Tuscan
Wilfred F. Mathewson
by Heard Smith & Tennant
Attys.

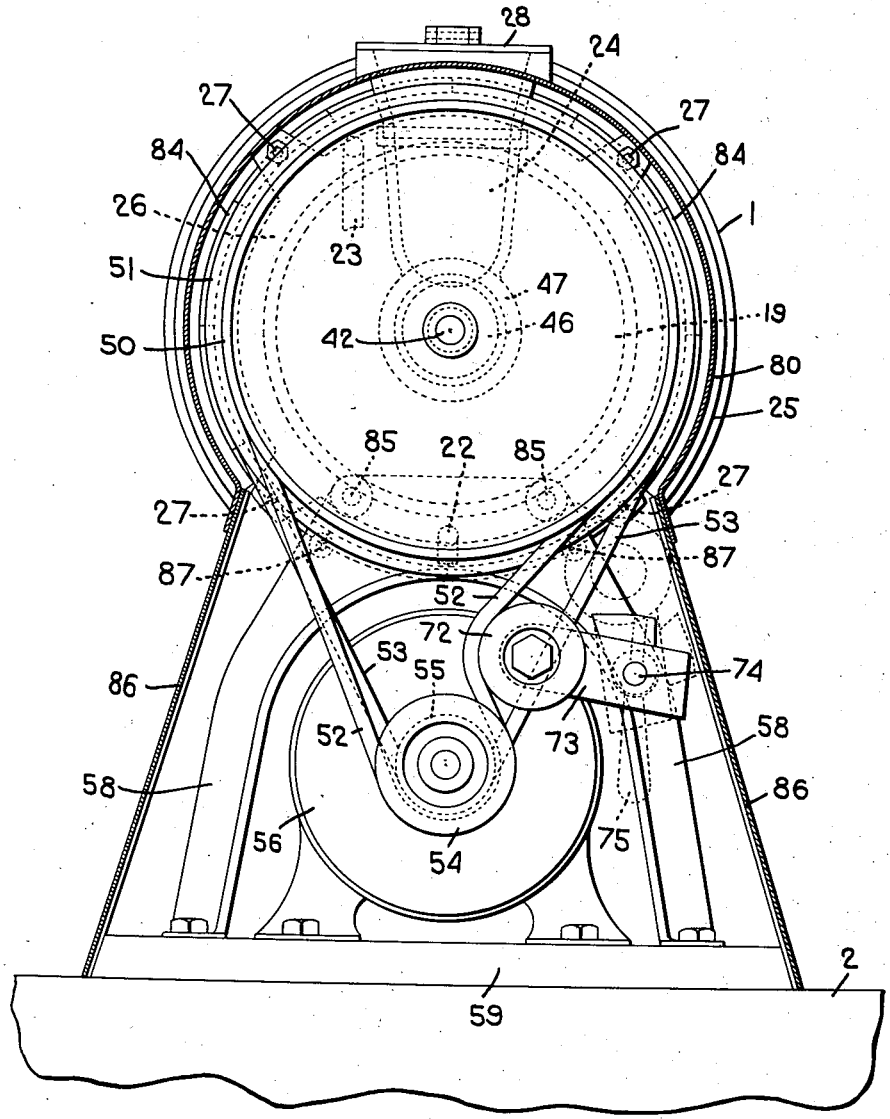

Dec. 15, 1936.　　　G. E. TUSCAN ET AL　　　2,064,131
ICE CREAM FREEZER
Filed Jan. 2, 1934　　　6 Sheets—Sheet 4

Inventors.
George E. Tuscan
Wilfred F. Mathewson
by Heard Smith & Tennant.
Attys.

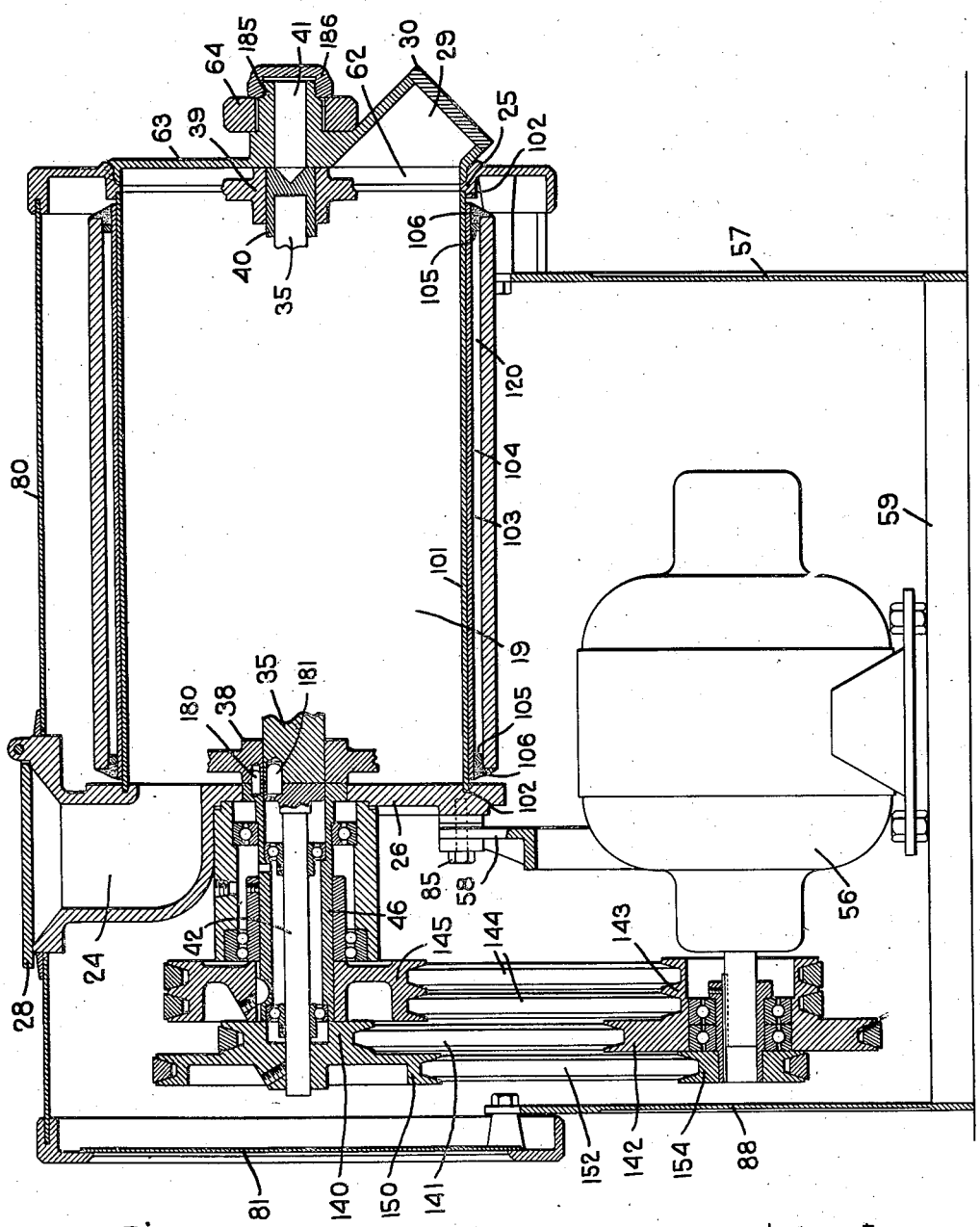

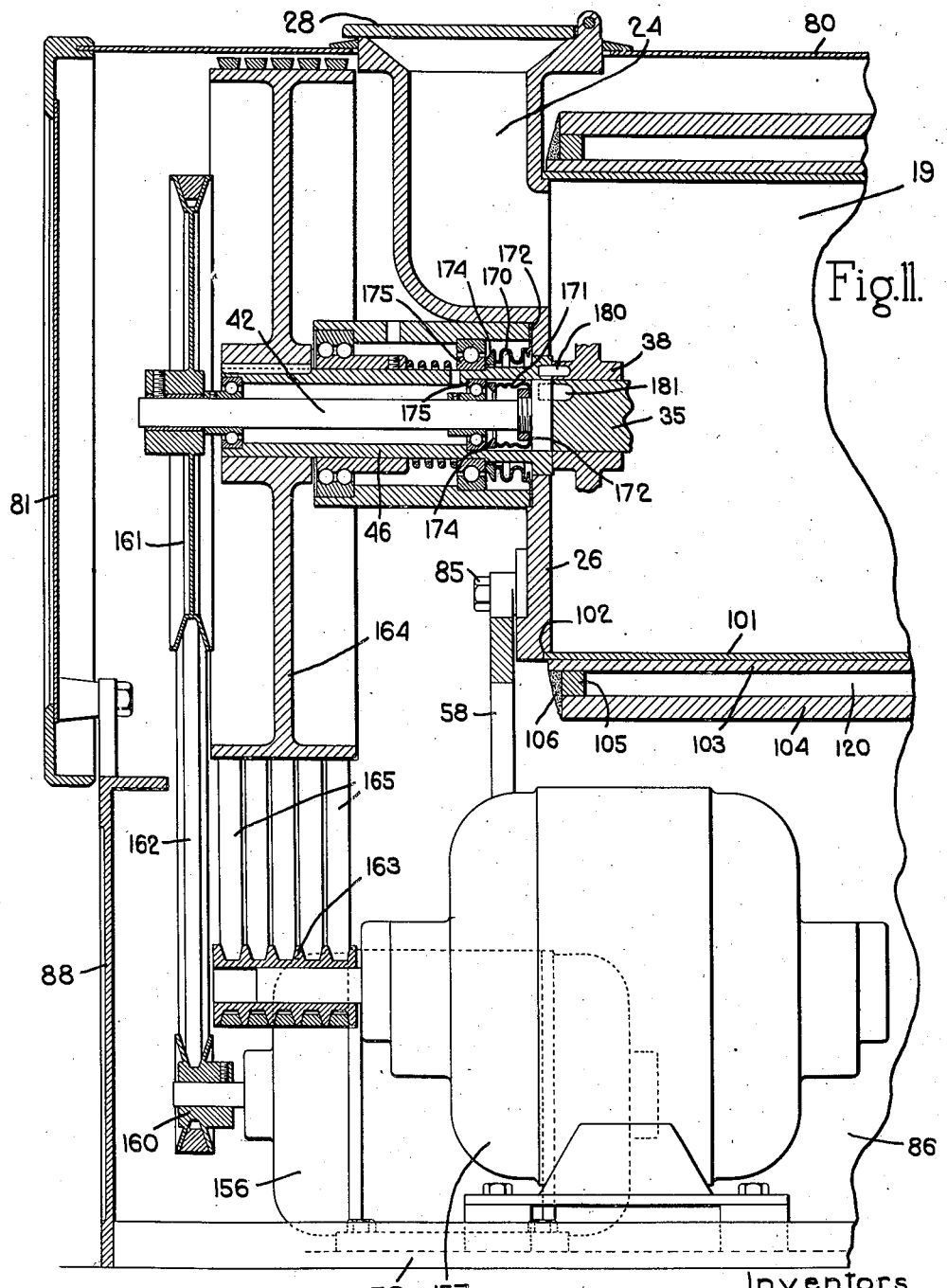

Patented Dec. 15, 1936

2,064,131

UNITED STATES PATENT OFFICE 2,064,131

ICE CREAM FREEZER

George E. Tuscan, Wollaston, and Wilfred F. Mathewson, North Weymouth, Mass.

Application January 2, 1934, Serial No. 704,902

2 Claims. (Cl. 259—10)

This invention relates to an ice cream freezer and has for its general object to provide an improved ice cream freezer by which ice cream may be frozen in a minimum length of time and by which the ice cream when frozen may be readily discharged from the freezing chamber.

Other objects of the invention will be more fully hereinafter set forth and the novel features of the invention will be pointed out in the appended claims.

In order to give an understanding of the invention we have illustrated in the drawings a selected embodiment thereof which will now be described.

In the drawings, Fig. 1 is a vertical sectional view through an ice cream freezer embodying our invention;

Fig. 3 is an enlarged section on the line 3—3, Fig. 1;

Fig. 10 is a fragmentary sectional view showing a different form of drive for the mixing elements;

Fig. 11 is another fragmentary sectional view showing still another form of drive for the mixing elements.

Figure 1:
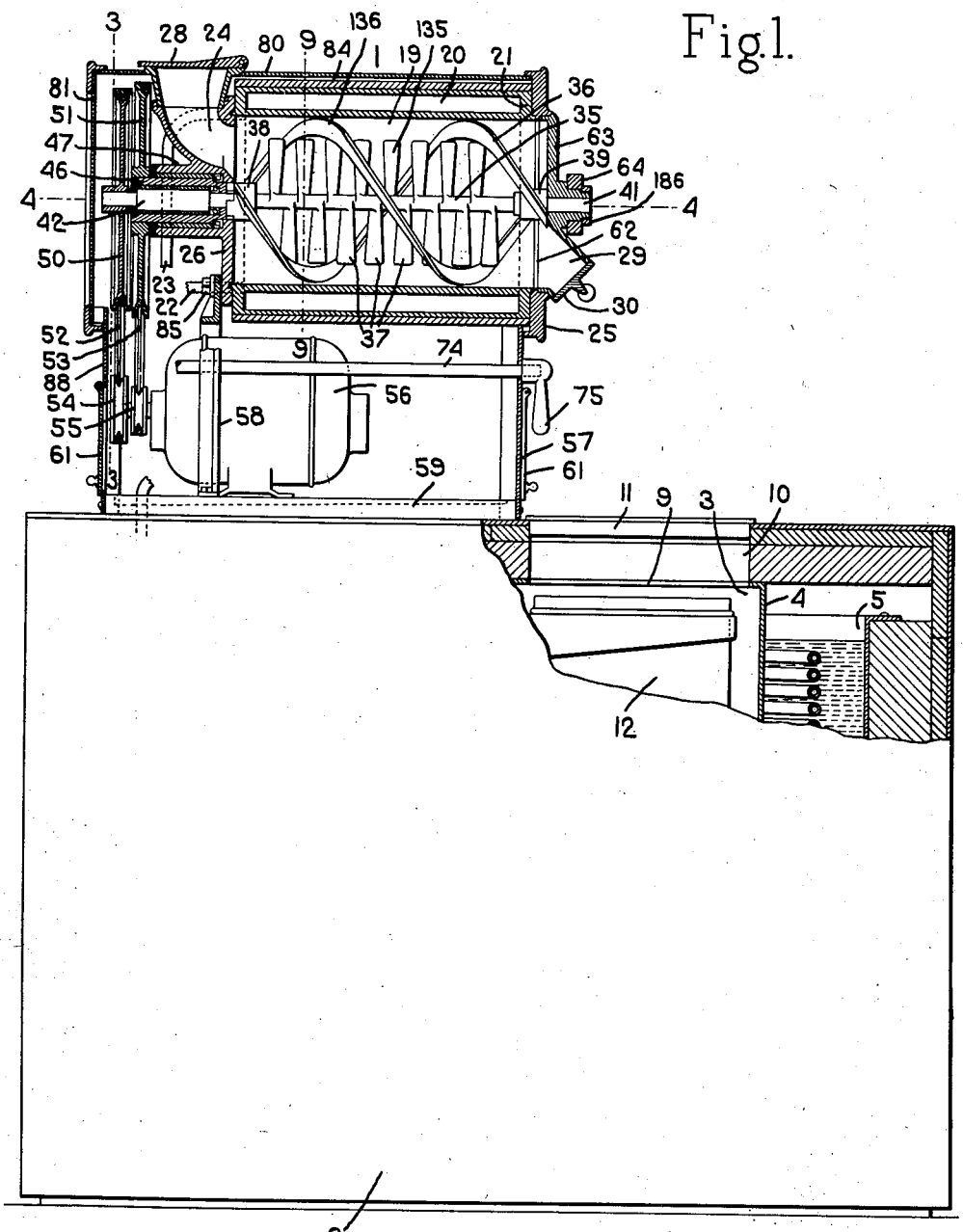

The ice cream freezer is indicated generally at 1 and it is shown as mounted on a hardening cabinet which is indicated at 2. This hardening cabinet may be of any suitable or usual construction, and is herein shown as having a construction similar to that illustrated in our co-pending application, Serial No. 662,262, filed March 23, 1933.

The hardening cabinet is provided with a refrigerated hardening chamber 3 which is constituted by the space within a housing or container 4, preferably of sheet metal. The container or housing 4 is shown as situated within a brine tank 5 formed within the hardening cabinet 2 and this tank contains not only the brine but the refrigerating coil by which the brine is kept at a low temperature. The upper end of the housing 4 is provided with an opening 9 and the top of the hardening cabinet 2 is also provided with an opening 10 which registers with the opening 9. 11 indicates a suitable cover for normally closing the opening 10.

The ice cream to be hardened will be deposited in a can 12 which is located beneath the openings 9 and 10.

The ice cream freezer 1 is formed with a horizontal cylindrical freezing chamber 19 which is surrounded by a refrigerating chamber 20 in which the refrigerant is circulated.

Figure 4:
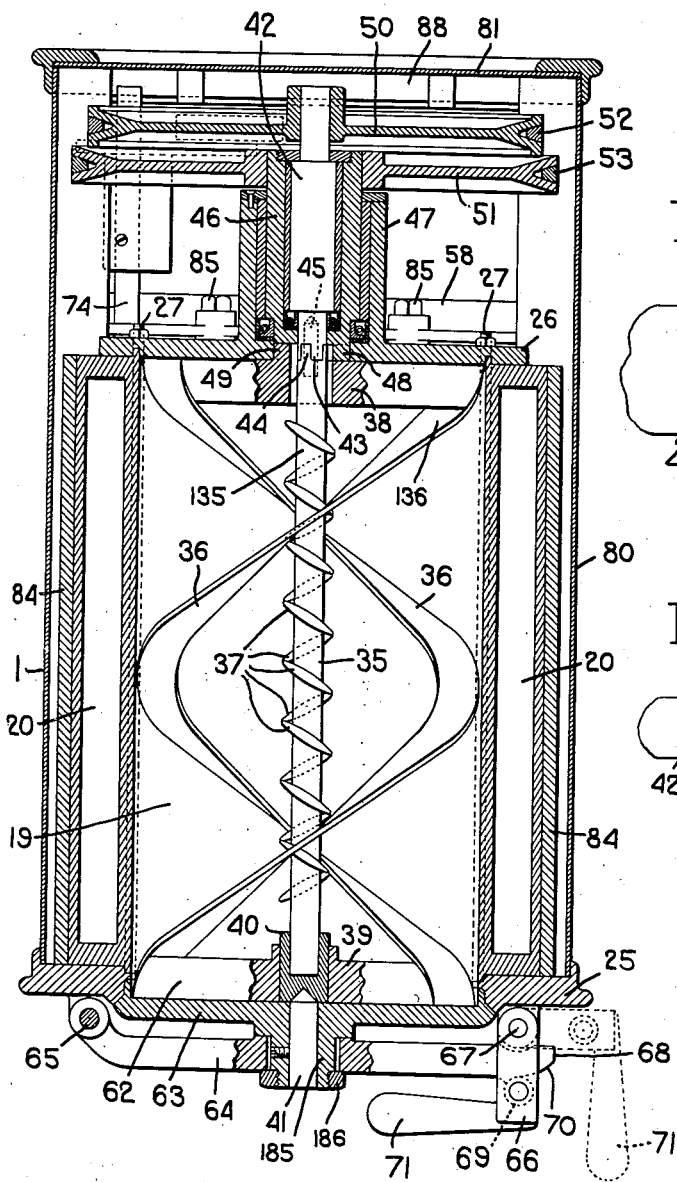
Fig. 4 is an enlarged section through the ice cream freezer on the line 4—4, Fig. 1.
Figures 5, 6:
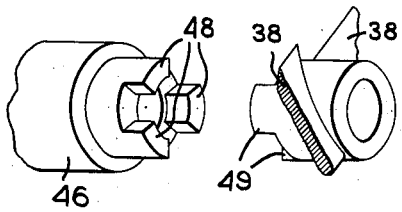
Fig. 5 is a perspective view of one element of the driving connection for one of the mixing elements of the freezer.
Fig. 6 is a fragmentary perspective view of the driving end of said element, that is, the end which engages with the driving member shown in Fig. 5.
Figures 7, 8:
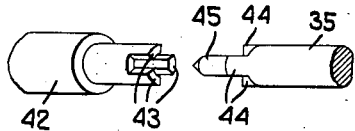
Fig. 7 is a fragmentary perspective view of the driving end of the shaft which rotates the paddle element of the freezer.
Fig. 8 is a fragmentary perspective view of the end of the paddle shaft which has driving engagement with the element shown in Fig. 6.

In the construction shown in Figs. 1 and 4 the freezing chamber 19 is formed within a cylindrical casting 21 which is cored to provide the refrigerating chamber 20 and the ends of the freezing chamber 19 are formed by heads 25 and 26 which close the ends of the cylindrical casting 21 and are tied together by tie rods 27.

The construction shown in Fig. 10 is somewhat different. In this embodiment the freezing chamber 19 is formed by a cylindrical member 101 which is clamped between the heads 25, 26 by the tie rods 27, the ends of the cylindrical member fitting into grooves 102 formed in said heads. This cylindrical member 101 is surrounded by a jacket member which contains the refrigerating chamber through which the refrigerating medium circulates. Such chamber is formed by the cylindrical member 103 which surrounds and tightly fits the member 101, the outer cylindrical member 104, and the spacing rings 105 at the ends of the cylindrical member, said members 103, 104 and 105 being rigidly connected by welding or brazing as shown at 106. This structure provides a refrigerating chamber 120 through which the refrigerating material can be circulated.

22 and 23 indicate inlet and discharge pipes connected to the refrigerating chambers 20 or 120 and through which the refrigerating material is circulated in usual manner.

The head 26 is provided with an inlet opening 24 through which the material from which the batch of ice cream is made can be introduced into the freezing chamber 19, said inlet being provided with a cover 28 by which it is closed.

Figure 2:
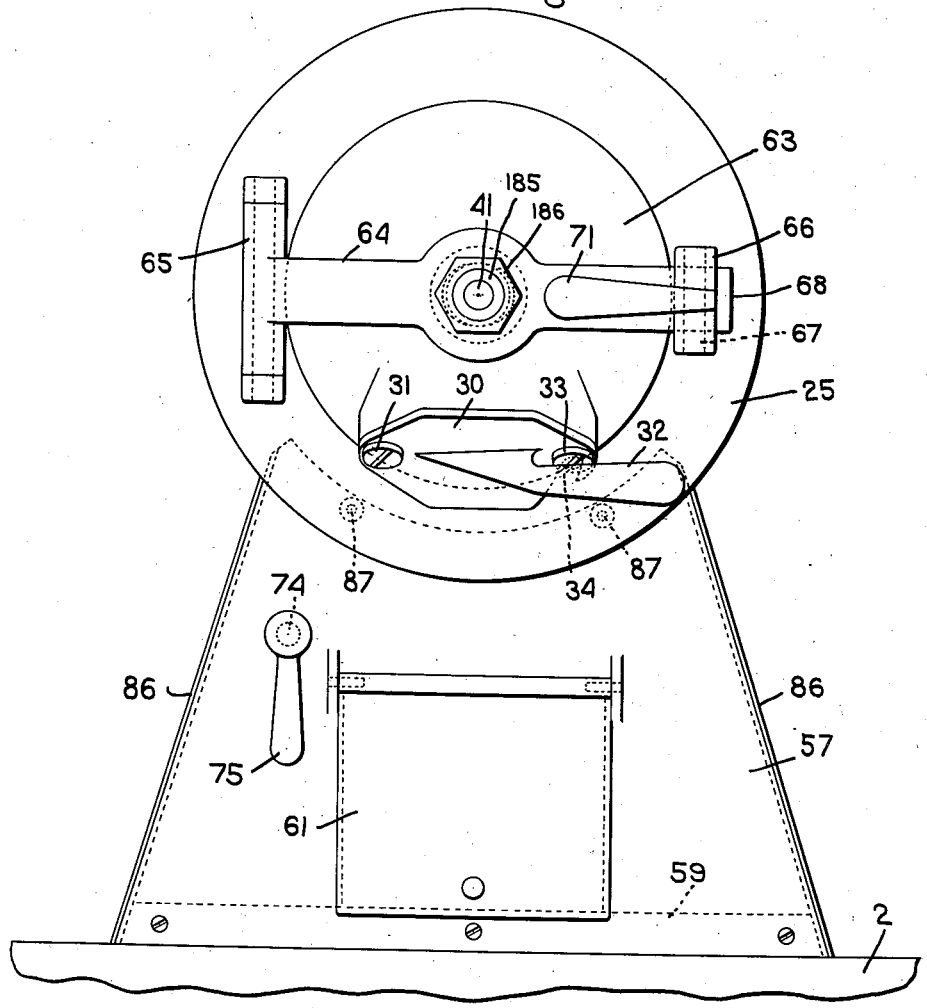
Fig. 2 is a front view of the ice cream freezer.
Figure 9:
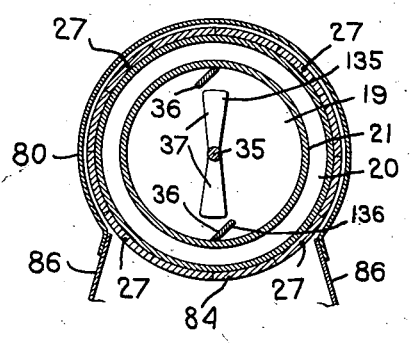
Fig. 9 is a reduced section on the line 9—9, Fig. 1.

The head 25 is provided with an opening of substantially the same size as the diameter of the freezing chamber 19, which opening is normally closed by a door 63 that will be presently described. Said door is formed with a discharge opening 29 through which the frozen ice cream may be discharged from the freezing chamber 19 and this discharge opening 29 is situated over the openings 9 and 10 so that it is possible to discharge the ice cream directly from the freezing chamber 19 into a can 12 which is located in register with the openings 9 and 10. The discharge opening 29 is normally closed by a gate or valve 30 pivotally mounted at 31 and provided with a handle 32 by which it may be swung upwardly into open position. The gate is retained in its closed position by a headed stud 33, the shank of which is received in a slot 34 with which the gate is provided. The slot is open at the lower side of the gate so as to permit the latter to be swung upwardly to open the discharge opening 29. When the gate is swung downwardly into the position shown in Fig. 2 the slot 34 engages the stud 33 and locks the gate in closed position.

Situated inside of the freezing chamber 19 are two stirring elements for keeping the ice cream stirred while it is being frozen. These stirring elements rotate about a horizontal axis and are indicated at 135 and 136 respectively. The element 135 is in the form of a shaft 35 extending axially of the freezing chamber 19 and provided with a plurality of radial blades 37. The stirring element 136 is in the form of a plurality of spirally-shaped blades 36 which are situated closely adjacent the wall of the chamber 19 and which encircle the stirring element 135 and are connected at their ends to spiders 38, 39. The head 26 and door 63 of the head 25 are provided with suitable supporting bearings for the spiders. In the construction herein shown there are two of the spiral blades 36, but more than two may be used, if desired.

The shaft 35 of the mixing element 135 is journalled at one end in a bearing member 40 which extends through and provides a bearing for the spider 39, said bearing member being centered by means of a pointed center pin 41 carried by the door 63 of the head 25, the point of the centering pin entering a correspondingly-shaped recess in the member 40 as best seen in Fig. 4. The other end of the shaft 35 of the stirring member 135 is supported and rotated by a driving shaft 42. This shaft 42 is provided at its end with teeth or projections 43 which interleave with complemental projections 44 formed on the end of the shaft 35 of the member 135.

The two shafts, that is, the shaft 35 and the driving shaft 42 are held in axial alignment through a coupling pin 45, shown in dotted lines in Fig. 4, one end of which enters an axial recess in the end of the shaft 35 and the other end of which enters an axial recess in the end of the driving shaft 42.

The stirring member 136 is rotated through the medium of a shaft 46 in the form of a sleeve which encircles the shaft 42 and forms a bearing therefor. This sleeve 46 is mounted for rotation in the hub 47 of the head 26 and on one end it is provided with projections 48 which are interleaved with corresponding complemental projections 49 formed on the spider 38.

Some suitable means is provided for driving the two shafts 42 and 46, preferably at different speeds, it being desirable that the shaft 42 which drives the stirring element 135 should rotate faster than the shaft 46 which drives the stirring element 136. In the construction shown in Figs. 1, 3 and 4 the two shafts 42 and 46 are driven at different speeds from a motor 56 which is shown as situated beneath the freezing chamber. The shaft 42 has fast thereon a pulley 50 which is driven by a belt 52 from a pulley 54 fast on the motor shaft and the cylindrical shaft 46 has fast thereon a pulley 51 which is driven by a belt 53 from a pulley 55 also fast on the motor shaft. The driving pulley 55 is smaller than the driving pulley 54, while the driving pulley 51 is larger than the driving pulley 50. As a result of these proportions the stirring element 135 will be driven at a greater speed than the stirring element 136.

In Fig. 10 there is shown a somewhat different drive by which the two stirring elements 135 and 136 may be driven at different speeds from the same motor. In this embodiment the motor 56 has fast to its shaft a driving pulley 154 which is connected by a belt 152 to a pulley 150 fast on the shaft 42. This pulley 150 has rigid therewith a smaller pulley 140 which is connected by a belt 141 to a pulley 142 loosely mounted on the motor shaft. The pulley 142 has rigid therewith a double pulley 143 connected by two belts 144 to a double pulley 145 that is fast on the shaft 46. The stirring element 135 is coupled to the shaft 42 by a coupling pin 181 and is thus driven directly from the motor shaft through the pulleys 154 and 150 and shaft 42. The stirring element 136 is coupled to the shaft 46 by a coupling pin 180 and is driven from the pulley 150 through the reducing drive mechanism 140, 142, 143, 145 and the shaft 46. The stirring elements are thus given their proper relative speeds of rotation.

In Fig. 11 I have shown a different construction wherein each stirring element is driven from its own motor. The stirring element 135 is driven from a motor 156 and the stirring element 136 is driven from a separate motor 157. The motor 156 is belted to the shaft 42 through the pulleys 160, 161 and the belt 162. The motor 157 is likewise belted to the shaft 46 through the pulleys 163, 164 and the multiple belt 165. These pulleys and belts are arranged to give the proper relative speeds to the two stirring elements.

The shell enclosing the freezing chamber is supported at its front end on a vertically-arranged supporting plate 57 and at its rear end on a yoke-shaped supporting frame 58 which straddles the motor 56. Both the supporting plate 57 and the supporting frame 58 are secured to a base 59 which in turn is mounted on the hardening cabinet 2.

The upper edge of the supporting plate 57 forms a cradle on which the ice cream freezer rests and said upper edge is secured to the head 25 by means of bolts 87. The yoke 58 which straddles the motor 56 is secured to the head 26 by means of bolts 85.

The pulleys and the motor are preferably enclosed in a suitable casing and for this purpose there is provided a second vertically-arranged plate 88 at the rear of the pulleys which is secured at its lower end to the base 59 and said plates 88 and 57 are connected along the sides by side plates 86, said plates 86, 88 and 57 forming a casing enclosing the motor.

The ice cream freezer is enclosed by a metal shell 80, the lower edges of which are secured to the upper edges of the side plates 86.

The vertically-arranged plates 57 and 88 are provided with openings closed by swinging doors 61 through which access may be had to the parts on the interior of the casing. The rear plate 88 is also provided with an opening in line with the pulleys 50, 51, which opening is closed by a removable cover or closure 81.

The door 63 with which the head 25 is provided is mounted so that it can be opened and closed. When the door is opened the stirring elements 135 and 136 can be removed through the open end 62 of the freezing chamber 19.

This door or closure 63 is shown as carried by an arm 64 which is pivoted to the head 25 at 65. The door is shown as having a hub portion 185 which extends through an opening in the arm 64, said hub having a nut 186 screw threaded thereto which serves to retain the door on the arm. The door is locked in its closed relation by means of a swinging locking yoke 66 pivoted to the head 25 at 67 and adapted to embrace the end 68 of the arm 64. The yoke 66 carries a roll 69 and the end 68 of the arm 64 has the cam surface 70 so that when the yoke is swung into the full line position Fig. 4 the roll by its engagement with the cam surface 70 will force the door or closure 63 firmly to its seat. This locking yoke 66 is provided with a handle 71 by which it may be swung from operative position shown in full lines Fig. 4 to the inoperative position shown in dotted lines.

The centering pin 41 is shown as carried by the door or closure 63 and when said door is opened this centering pin is thus withdrawn from the bearing member 40.

Both the stirrers may be withdrawn through the open end 62 of the freezing chamber 19.

The connection between the stirring elements and the driving shafts 42 and 46 are such as to readily permit these stirring elements to be separated from the shafts.

The stirring elements 135, 136 not only function to stir or mix the ice cream during the freezing process but they also serve to facilitate the discharge of the ice cream through the discharge opening 29 when the ice cream mass has been frozen to the desired amount and when it is ready to be deposited in one of the cans 12 of the hardening cabinet.

The blades 37 are arranged at an angle as shown in Fig. 4 and the rotation of the shaft 35 is in a direction which tends to force the material within the chamber 19 toward the left in Fig. 1 or toward the head 26.

The spiral blades 36 are so shaped and their direction of rotation is such that they tend to force the material in the chamber 19 to the right in Fig. 1 or toward the opening 62. When both stirring elements are operating, therefore, the blades 37 tend to force the central portion of the mass of ice cream toward the left Fig. 1 while the spiral blades 36 tend to force the outer portion of the ice cream mass toward the right. When the ice cream has been frozen to the proper consistency, one way of discharging it from the chamber 19 is to open the gate 30 and then to operate the stirring element 136 with the stirring element 135 idle or inactive. The rotation of the stirring element 136 tends to force the ice cream toward the head 25 and if the stirring element 135 is inoperative the result will be that the ice cream will be forced out of the discharge opening 29.

One device for rendering the stirring element 135 inoperative is shown in Fig. 3. Such device comprises a belt tightener 72 co-operating with the belt 53. This belt tightener is in the form of a roll carried by an arm 73 mounted on a shaft 74 that is journaled in the supporting frames 57 and 58. The belt tightener normally is in the position shown in Fig. 3 in which position it causes the belt 52 to be sufficiently tight to properly drive its pulley 50. When this belt tightener is swung into the dotted line position Fig. 3 the belt 52 is slackened so that it will fail to drive its pulley 50 thereby rendering the stirring element 135 inoperative. When, therefore, the belt tightener is in the dotted line position the stirring blade 136 only will be rotated and the blades 37 will be inoperative. When the parts are operating in this way and the gate 30 is opened the blades 36 will function to discharge the ice cream through the discharge port 29.

In the construction shown in Fig. 11 the stirring element 135 may be rendered inoperative simply by cutting out the motor 156. As stated above the construction shown in Fig. 11 employs two independent motors, one for each stirring element and these motors can be run separately and independently. Hence when the ice cream is to be discharged all that is necessary is to open the gate 30 and cut out the motor 156 while leaving the motor 157 in operation. It is not necessary, however, to stop the operation of the stirrer 135 when the ice cream is to be discharged because the discharge can be effected with both stirrers operating although a quicker discharge is secured by having the stirrer 135 inactive while the stirrer 135 is rotating. The driving construction shown in Fig. 10 has no provision for rendering the stirrer 135 inoperative and with this construction both stirrers will be rotating during the discharge of the ice cream.

Any suitable construction may be employed for sealing the joint at the driving end of the stirring elements so as to prevent leakage. One way of doing this is through the medium of expansible sealing members 170, 171 which may be made of copper or other ductile metal. One end of each sealing member is provided with a flange 172 which is clamped rigidly to the head 26 and the other end of each sealing member terminates in a sealing ring 174 which engages the bearing member 175.

The construction of the hardening cabinet is not claimed herein as it forms the subject matter of our co-pending application Serial No. 662,262, filed March 23, 1933.

While we have illustrated herein a selected embodiment of the invention we do not wish to be limited to the constructional features shown.

We claim:

1. An ice cream freezer having a horizontally-arranged freezing chamber open at one end, a removable closure for said open end, two coaxial rotary stirring elements in said freezing chamber, the outer stirring element having a spider portion at the end thereof adjacent the open end of the chamber, said spider portion having a bearing opening, a bearing member removably mounted in said opening and providing a supporting bearing for the corresponding end of the inner stirring element, said bearing member being retained in position in the spider by the closure when it is in closed position, and a centering pin carried by and removable with the closure and cooperating with the bearing member to hold the latter in operative position when the closure is in closed position.

2. An ice cream freezer having a horizontally-arranged freezing chamber open at one end, a removable closure for the open end of said chamber, two coaxial rotary stirring elements in said chamber, a bearing member removably carried by the end of the outer stirring element adjacent the open end of the chamber, said bearing member being removable through said open end and being held in position in the outer stirring element by the closure, said bearing member having a recess in its inner end, the inner stirring element having a trunnion received in said recess, and a centering pin carried by the closure and cooperating with the bearing member to hold the latter centered when the closure is in closed position.

GEORGE E. TUSCAN.
WILFRED F. MATHEWSON.